United States Patent [19]
Cech

[11] Patent Number: 5,642,006
[45] Date of Patent: Jun. 24, 1997

[54] SYNCHRONIZING DEVICE

[75] Inventor: Michael Cech, Vienna, Austria

[73] Assignee: Elin Energieversorgung Gesellschaft MBH, Vienna, Austria

[21] Appl. No.: 513,863

[22] PCT Filed: Mar. 17, 1994

[86] PCT No.: PCT/AT94/00028

§ 371 Date: Sep. 13, 1995

§ 102(e) Date: Sep. 13, 1995

[87] PCT Pub. No.: WO94/22200

PCT Pub. Date: Sep. 29, 1994

[30] Foreign Application Priority Data

Mar. 19, 1993 [AT] Austria ................. 550/93

[51] Int. Cl.[6] ........................................ H02J 3/42
[52] U.S. Cl. .................. 307/87; 307/19; 307/86; 322/44; 341/116; 318/721; 290/40 R
[58] Field of Search ................... 307/87, 86, 85, 307/19; 322/44; 290/40; 341/116; 318/721

[56] References Cited

U.S. PATENT DOCUMENTS

| 4,031,407 | 6/1977 | Reed ................. 307/87 |
| 4,473,792 | 9/1984 | Nola ................. 322/47 |
| 4,492,874 | 1/1985 | Near ................. 307/87 |
| 4,656,413 | 4/1987 | Bourbeau ................. 322/47 |
| 5,390,068 | 2/1995 | Schylz et al. ................. 361/95 |
| 5,422,518 | 6/1995 | Sashida ................. 307/75 |

FOREIGN PATENT DOCUMENTS

| 395792 | 3/1993 | Austria . |
| 0667051 | 8/1996 | European Pat. Off. . |
| 9408382 | 4/1994 | WIPO . |

OTHER PUBLICATIONS

Yang Yi–han et al., "A Fast Following Synchronizer of Generators" IEEE Transactions on Energy Conversion vol. 3, No. 4, pp. 765–769 (Dec. 1988).
Austrian Office Action.
Translation of Austrian Office Action.
International Search Report.

*Primary Examiner*—David S. Martin
*Assistant Examiner*—Albert W. Paladini
*Attorney, Agent, or Firm*—Greenblum & Bernstein P.L.C.

[57] ABSTRACT

A synchronizing device for a parallel connection of a synchronous generator and an a.c. network. The device includes a measuring circuit for measuring the voltage and frequency of the generator and the a.c. network and for measuring the phase angle between the generator and the a.c. network. The measuring circuit includes control outputs for regulating the rotational speed of the generator drive. A set value for the generator frequency includes a defined slip at the start of balancing. The measuring circuit also regulates the voltage output of the generator to match the a.c. network voltage. Once the phase angle between a.c. network voltage and generator voltage has fallen below a predefined value, null balance occurs.

4 Claims, 1 Drawing Sheet

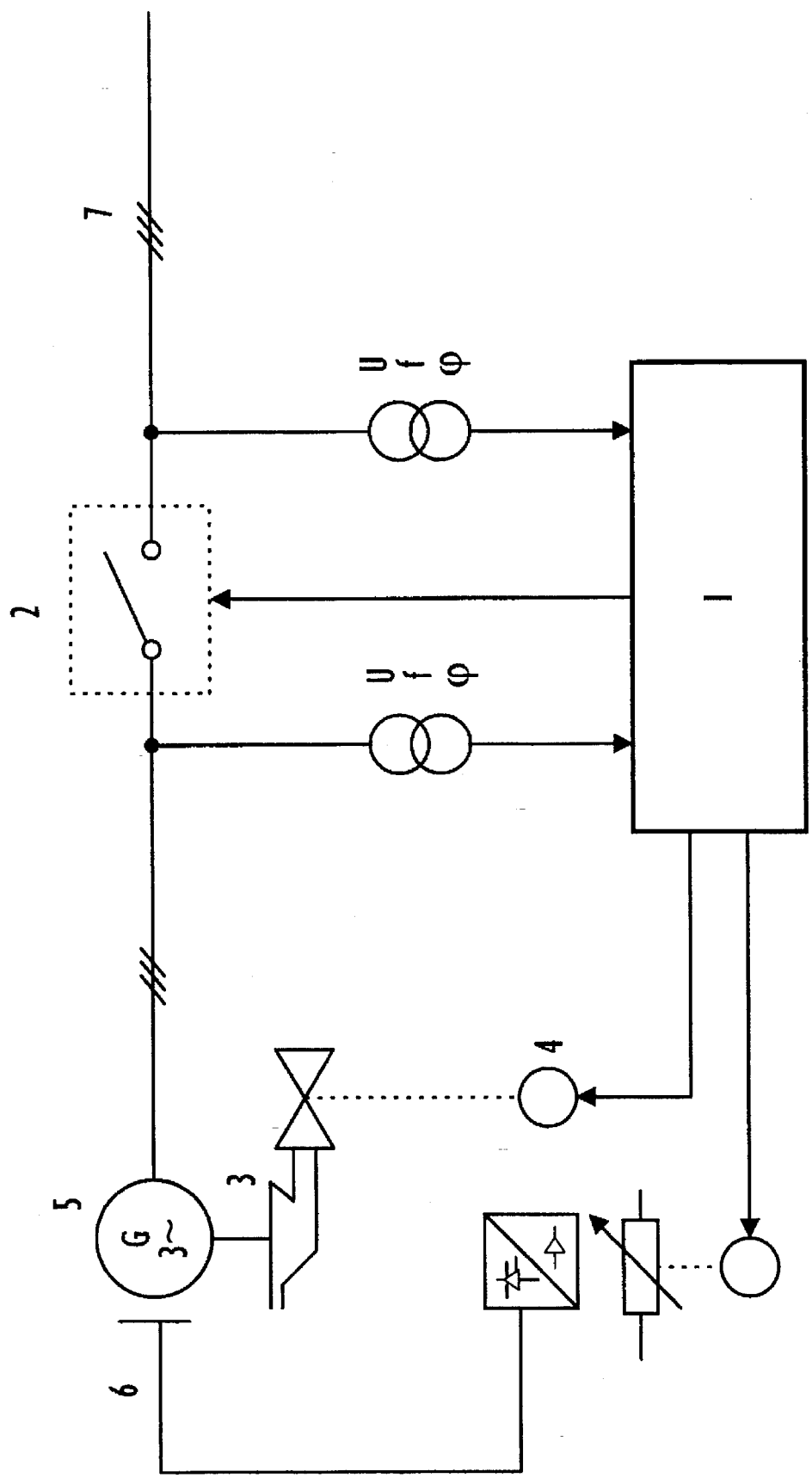

SYNCHRONIZING DEVICE

BACKGROUND OF THE INVENTION

1. Field of the Invention

The invention relates to a synchronizing device for the parallel connection of a synchronous generator and an a.c. network. A measuring circuit is employed for mesuring the voltage and the frequency from the generator and of the a.c. network and for measuring the phase angle between the network and the generator voltage. The measuring circuit includes control outputs for rpm regulation of the generator drive to adjust the actual value of the generator frequency to a set value range matched to the network frequency. The measuring circuit is also employed for voltage regulation of the generator to adjust of the generator voltage to the network voltage. A with a switching command output is provided for a coupling switch which, in the course of a set value adjustment of the voltage and frequency as a function of a set value adjustment of the phase angle, can be triggered by means of a predetermined set value calculated by a computer from the frequency difference and the predeterminable switching time of the coupling switch.

2. Discussion of the Background of the Invention and Material Information

Until a few years ago it was customary to synchronize two a.c. or rotary current networks by means of a double voltage or difference voltage for example, a double reed frequency meter and a rotating phase angle meter, i.e., the so-called synchronoscope. The correct and recurring synchronization time can be read off the phase angle meter. The most important prerequisite for connecting two a.c. networks (or a generator and an a.c. network) is that the time values of the voltages must agree at the time of the connection. This means that the effective values of the conductor voltages, the frequencies, the phase position and the phase sequence of the voltages must be the same.

It is almost impossible to manually set the frequency of the generator voltage exactly to the frequency of the a.c. network; for this reason beats occur. Two a.c. networks can be connected or a generator can be connected to an a.c. network, during each zero passage of the beat, wherein the time values of the voltages agree and which is the synchronization time.

In the course of manual synchronization, the skill and the experience of the operating personnel determine how closely to the ideal synchronization time a generator is connected to the a.c. network. If synchronization takes place fully automatically by constant measurement of the difference voltage, i.e., the difference frequency and the phase shift between the two voltages, it is possible to determine the synchronization time fairly accurately. Because the individual measurements by the known devices take place analogously, it is not possible to perform a switching operation optimally at the next synchronization time.

To assure stable and rapid synchronization of a synchronous generator with an arbitrary generator drive, a synchronizing device was proposed in Austrian application öA 820/88, published on Jul. 15, 1992. A measuring circuit for determining parameters for the dependence of the chronological rpm variation of the generator drive on a control signal action of its rpm regulation, and a memory for these parameters were proposed. From the stored parameters a computer can then calculate the size of the control signal for the desired rpm change necessary for a frequency adjustment. The measuring circuit was not described in detail nor were details given as to the times this measuring circuit stores the parameters in the memory. The specification merely mentioned that dependence of the chronological rpm variation can be detected by means of a control signal action on the rpm control via the frequency measurement.

SUMMARY OF THE INVENTION

It is the object of an invention to improve the present above mentioned synchronizing device in such a way that the behavior of the control system of the generator and generator drive is better taken into consideration for a set command to the rpm regulator of the generator drive. According to the present invention in starting a generator determination of the optimal set commands for the rpm regulator is made. The computer detects the regulation response to a respective set command to the rpm regulator of the generator drive and stores it in a memory. The computer determines, from all regulation responses, the optimal set, command (or the optimal command length and command pause) of the rpm regulator for each difference between the set value and actual value of the voltage and the frequency. At the start of the adjustment, the preset actual value for the generator frequency contains a defined slippage, and that, when the phase angle between the network and generator voltage has fallen therebelow and attained a suitable value, frequency adjustment to zero takes place.

An advantage of to present invention is less frequent use of the turbine regulation, as compared to the known systems, and the ability to synchronize under ideal conditions, because the service life of the entire machine unit is considerably increased.

According to another aspect of the invention, the computer independently performs the determination of the optimal set command by means of a program.

The embodiment provides the advantage of achieving the greatest possible accuracy an enables the present invention to be integrated into a fully automatic installation.

BRIEF DESCRIPTION OF THE DRAWING

The present invention is further described in the detailed description which follows, in reference to the noted drawing by way of non-limiting examples of a preferred embodiment of the present invention, wherein:

The Figure is a schematic drawing of the preferred embodiment of the present invention.

DETAILED DESCRIPTION OF THE PREFERRED EMBODIMENTS

The particulars shown herein are by way of example and for purposes of illustrative discussion of the preferred embodiment of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawing making apparent to those skilled in the art how the several forms of the invention may be embodied in practice.

The invention will be explained in detail by means of an exemplary embodiment represented in the drawing. The drawing figure shows an electrical network 7, to which a generator 5 can be switched by means of a coupling switch 2. A generator drive 3 coupled with the shaft of the generator 5 can be a hydraulic turbine or a steam turbine system. A voltage U, frequency f and phase φ position upstream and downstream of the coupling switch 2 is provided to a synchronizing device 1 containing a digital computer. From this the synchronizing device 1 determines the synchronization time and issues appropriate set commands to a regulator 4 for regulating the rotational speed (rpm) of the generator drive 3. The regulating behavior of the generator drive, determined before start-up and stored, is taken into consideration by the synchronizing device 1. The voltage adjustment of the generator 5 is performed by means of an exciter 6. An appropriate set signal is also made available by the synchronizing device 1.

In accordance with the selection of the synchronizing device 1 of the invention there is a slippage which is a function of the respective installation conditions. Synchronizing device 1 does not make an adjustment to a slippage of 0.00 Hz, as in the known systems, but permits a minimum slippage of an order of magnitude between 0.01 to 0.03 Hz to exist. Frequency adjustment to zero takes place only when the phase angle between the generator 5 and the network voltage 7 falls below a suitable value, i.e., the phase angle φ is now located within a predetermined tolerance limit. Therefore, the synchronizing device 1, which includes stored time constants of rpm control system, can connect generator 5 with the network 7 via the coupling switch 2. The time of start of the slippage regulation is now determined by the computer by means of the regulating parameters and actual measured values. If suddenly a different slippage occurs, for example, because of a change in the network conditions, it will be limited to a defined value by the frequency regulation, and the further course takes place as previously described.

The present invention requires less frequent demand for the turbine regulation, as compared with the known systems, and enables synchronization under ideal conditions. The service life of the entire system is considerably increased for both reasons.

I claim:

1. A synchronizing device for a parallel connection of a synchronous generator and an a.c. network, said device comprising:

a measuring circuit for measuring a voltage and frequency of said generator and of said a.c. network, and for measuring a phase angle between said a.c. network and said generator voltages;

said measuring circuit comprising control outputs for an rpm regulator of a generator drive to adjust an actual value of said generator frequency to within a set value range;

said measuring circuit further for measuring a voltage regulation of said generator to adjust said generator voltage to said a.c. network voltage;

said measuring circuit further comprising a switching command output for a coupling switch and a computer, said switching command output triggerable by a predetermined set value calculated by said computer from a frequency difference and a predeterminable switching time of said coupling switch, p1 wherein, when said generator is initially started, said computer determines a plurality of optimal set commands for said rpm regulator by detecting a regulation response to each one of a plurality of respective set commands and stores said optimal set commands in a memory, each of said plurality of optimal set commands associated with a difference between said set value and said actual value of the frequency of said generator, wherein, at a start of adjustment, a preset actual value for said generator frequency contains a defined slippage, and wherein, when said phase angle between said a.c. network and generator voltage falls below a predefined value, synchronization is achieved.

2. The synchronizing device in accordance with claim 1, said control outputs for said rpm regulator adjusting said actual value of said generator frequency to match said network frequency.

3. The synchronizing device in accordance with claim 1, said switching command output triggerable during a set value adjustment of said voltage and frequency as a function of a set value adjustment of said phase angle.

4. The synchronizing device in accordance with claim 1, said computer determining an optimal command length and a command pause for said rpm regulator.

* * * * *